Patented Oct. 3, 1950

2,524,684

UNITED STATES PATENT OFFICE 2,524,684

DI-2-ALKENYL PHTHALATE POLYMERS

Pliny O. Tawney, Passaic, N. J., assignor to United States Rubber Company, New York, N. Y., a corporation of New Jersey No Drawing. Application December 4, 1946, Serial No. 713,919

4 Claims. (Cl. 260—78.4)

This invention relates to an improved method of making soluble unsaturated polymers of certain di-2-alkenyl phthalates. These polymers are soluble in a variety of organic liquids, and are convertible to the insoluble, infusible state, when desired, by further polymerization or by copolymerization with reactive ethylenic compounds.

According to my process, improved yields of the said soluble polymer may be obtained by carrying out the polymerization in the presence of oxygen introduced as such or in admixture with other inert gases (air), a minor proportion of a terpene hydrocarbon, and a small amount of a hydrocarbon-soluble heavy metal salt of naphthenic acid, e. g., manganese naphthenate. The polymerization proceeds smoothly at moderate temperatures and does not require the presence of inhibitors of gelation, or other precautions to avert premature insolubilization of the monomer.

Polymerized di-2-alkenyl phthalates prepared by my method are of uniform character since they are uncontaminated by the high molecular weight gels often encountered in the prior art and the necessity for extensive purification is therefore obviated. The polymers are completely soluble in a variety of organic solvents; they contain relatively large amounts of unsaturation; and they cure rapidly to the insoluble infusible state when heated at 200° C. Hence my method of polymerization yields products which are well adapted to the formation of coating compositions particularly baking varnishes and enamels.

Exemplary of suitable di-2-alkenyl phthalates are diallyl phthalate and the various di-(2-alkylallyl) phthalates illustrated by, but without being limited thereto, dimethallyl phthalate, and allyl methallyl phthalate.

Exemplary of suitable terpenes, among others, are α-pinene, dipentene, or mixtures of these either alone or together with other terpene hydrocarbons (e. g., turpentine). The terpene may be used in widely ranging amounts, e. g., from about 10% up to less than 50%, e. g., 20%-30%, by weight of the di-2-alkenyl phthalates. From the standpoint of economy and overall efficiency, it will be found that about 20% of the terpene is sufficient.

Any of the heavy metal salts of naphthenic acids, including those of manganese, and cobalt, may be used, in concentration by weight figured on the metal, of about 0.5% based on the weight of the monomeric phthalate. While smaller or larger amounts of the salts may be used, such choice should be guided by the desire to obtain optimum yield and the avoidance of excess discoloration of the products. For purposes of illustration, the manganese salt is referred to hereafter, but not as a limitation.

The polymerization is carried out by dissolving the metal naphthenate in a mixture of the di-2-alkenyl phthalate and the terpene and heating the resulting solution with vigorous agitation, while bubbling a stream of air through it. The rate of the polymerization reaction increases with increasing temperatures but reaction temperatures above about 130° C. cause excessive discoloration of the product and hence somewhat lower temperatures, i. e., from 100° C. to 120° C., are preferred. The course of the polymerization reaction can be followed by observing the increase in the viscosity of the reaction mixture and after halting the reaction by cooling, the polymer is isolated by suitable means, e. g., by extracting the terpene and any unreacted di-2-alkenyl phthalate with a solvent in which the polymer is insoluble. If desired, further purification can be effected by dissolving the polymer in a solvent such as acetone and precipitating it with a non-solvent such as n-hexane.

When freed from solvents the polymer can be cast or molded in a known manner to form rods, blocks, sheets. Alternatively, it can be dissolved in appropriate solvents and employed as a coating or impregnating composition. Application of heat to compositions containing the polymers, particularly in the presence of polymerization catalysts, induces further polymerization to form insoluble infusible products. Suitable dyes, pigments, fillers, plasticizers, resins, etc., can be added to the polymers prior to the final cure.

The polymers can also be insolubilized by copolymerization with reactive ethylenic compounds such as n-butyl acrylate, diethyl fumarate, diallyl fumarate, etc. Since the polymers prepared by my method are of relatively low molecular weight, they dissolve readily in a variety of these copolymerizable monomers to form solutions of low viscosity which can be totally polymerized without leaving any solvent to be evaporated. Such solutions are useful not only as coatings but also in casting and impregnating operations where a product capable of being pre-formed and then cured or "set" in a final form, are desired.

The following examples disclose my invention in more detail, all parts being by weight:

Example 1

A solution consisting of 100 parts of diallyl phthalate, 20 parts of gum spirits of turpentine and 8.5 parts of a 6% solution of the manganese salt of naphthenic acids dissolved in hydrocarbon solvent (sold commercially by the Nuodex Products Co. Inc., of Elizabeth, New Jersey) is heated at 120° C., with agitation, for 21 hours while a stream of air is bubbled through the solution. After cooling of the viscous reaction mixture, n-hexane is added and the precipitated polymer is further purified by repeated solution in acetone and precipitation with n-hexane. When dried in vacuo to constant weight, 68 parts of polymeric solid are obtained which is readily soluble in acetone, chloroform, cyclohexanone and in an 80–20 mixture of xylene and butanol.

In contrast, when 100 parts of diallyl phthalate are polymerized according to the general prior art method by heating at 120° C., with 0.311 part of 60% solution of tertiary butyl hydrogen peroxide, the reaction mixture begins to gell after 11 hours, and only 28.1 parts of soluble polymer can be obtained.

*Example 2*

Three parts of the polymer of Example 1 above are dissolved in a mixture of 2.5 parts of xylene and 7.5 parts of chloroform. The solution is concentrated to about one-half its original volume by evaporation at 25° C. and is then spread on a steel panel and baked at 260° C. for 25 minutes; the resulting clear glossy mar-resistant film is insoluble in acetone, xylene and chloroform.

While I have shown and described various embodiments of the invention, it is to be understood that the invention is susceptible to other modifications which appear within the spirit of the invention and the scope of the appended claims.

Having thus described my invention, what I claim and desire to protect by Letters Patent is:

1. A process of preparing acetone-soluble unsaturated polymers of di-2-alkenyl phthalates which comprises heating below 130° C. a monomeric di-2-alkenyl phthalate selected from the group consisting of diallyl phthalate, dimethallyl phthalate and allyl methallyl phthalate in admixture with oxygen, a cyclic terpene hydrocarbon in a proportion of 10–30% based on the weight of the phthalate, and a heavy metal naphthenate selected from the class consisting of manganese and cobalt naphthenates.

2. A process of preparing acetone-soluble unsaturated polymers of di-2-alkenyl phthalates which comprises heating below 130° C. a liquid mixture of a monomeric di-2-alkenyl phthalate selected from the group consisting of diallyl phthalate, dimethallyl phthalate and allyl methallyl phthalate, a cyclic terpene hydrocarbon in a proportion of 10–30% based on the weight of the phthalate, and a heavy metal naphthenate selected from the class consisting of manganese and cobalt naphthenates, and during the heating passing into the mixture a stream of air, and continuing the said heating of the reaction mixture for a time effective to form the soluble polymer in solution, extracting from the reaction mixture terpene hydrocarbon, and any unreacted monomeric phthalate.

3. A process of preparing an acetone-soluble unsaturated polymer of diallyl phthalate which comprises heating below 130° C. the diallyl phthalate in admixture with oxygen, turpentine in proportion of 10–30% based on the weight of the phthalate, and manganese naphthenate.

4. A process of preparing an acetone-soluble unsaturated polymer of dimethallyl phthalate which comprises heating below 130° C. the dimethallyl phthalate in admixture with oxygen, turpentine in proportion of 10–30% based on the weight of the phthalate, and manganese naphthenate.

PLINY O. TAWNEY.

REFERENCES CITED

The following references are of record in the file of this patent:

UNITED STATES PATENTS

| Number | Name | Date |
|---|---|---|
| 2,273,891 | Pollack et al. | Feb. 24, 1942 |